United States Patent
Wang

(10) Patent No.: US 11,483,259 B2
(45) Date of Patent: *Oct. 25, 2022

(54) VOQ-BASED NETWORK SWITCH ARCHITECTURE USING MULTI-STAGE ARBITRATION FABRIC SCHEDULER

(71) Applicant: Marvell Asia Pte, Ltd., Singapore (SG)

(72) Inventor: Weihuang Wang, Los Gatos, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 141 days.

This patent is subject to a terminal disclaimer.

(21) Appl. No.: 16/878,452

(22) Filed: May 19, 2020

(65) Prior Publication Data

US 2020/0280528 A1 Sep. 3, 2020

Related U.S. Application Data

(63) Continuation of application No. 16/054,627, filed on Aug. 3, 2018, now Pat. No. 10,700,998.

(51) Int. Cl.
*H04L 49/00* (2022.01)
*H04L 47/6275* (2022.01)
*H04L 47/52* (2022.01)
*H04L 49/253* (2022.01)
*H04Q 11/00* (2006.01)
*H04L 12/70* (2013.01)

(52) U.S. Cl.
CPC ........ *H04L 49/3045* (2013.01); *H04L 47/527* (2013.01); *H04L 47/6275* (2013.01); *H04L 49/254* (2013.01); *H04L 2012/5679* (2013.01); *H04Q 2011/005* (2013.01)

(58) Field of Classification Search
CPC ............... H04L 49/3045; H04L 47/527; H04L 47/6275; H04L 49/254; H04L 2012/5679; H04Q 2011/005

See application file for complete search history.

(56) References Cited

U.S. PATENT DOCUMENTS

| | | | |
|---|---|---|---|
| 7,133,927 B2 | 11/2006 | Guo et al. | |
| 7,139,271 B1* | 11/2006 | Parruck | H04L 47/2441 370/476 |
| 2010/0142537 A1* | 6/2010 | Lee | H04L 49/354 370/395.53 |
| 2014/0211639 A1* | 7/2014 | Matthews | H04L 45/02 370/250 |
| 2016/0127267 A1* | 5/2016 | Kumar | H04L 49/10 370/400 |
| 2016/0226797 A1* | 8/2016 | Aravinthan | H04L 49/252 |

* cited by examiner

*Primary Examiner* — Michael A Keller

(57) ABSTRACT

A network switch is capable of supporting cut-through switching and interface channelization with enhanced system performance. The network switch includes a plurality of ingress tiles, each tile including a virtual output queue (VOQ) scheduler operable to submit schedule requests to a fabric scheduler. Data is requested in unit of quantum, which may aggregate multiple packets, and which reduces schedule latency. Each request is associated with a start-of-quantum (SoR) state or a middle-of-quantum (MoR) state to support cut-through. The fabric scheduler performs a multi-stage scheduling process to progressively narrow the selection of requests, including stages of arbitration in virtual output port level, virtual output port group level, tile level, egress port level, and port group level. Each tile receives the grants for its requests and accordingly sends request data to a switch fabric for transmission to the destination egress ports.

21 Claims, 10 Drawing Sheets

VOQ-BASED NETWORK SWITCH ARCHITECTURE USING MULTI-STAGE ARBITRATION FABRIC SCHEDULER

RELATED U.S. APPLICATION

This application is a continuation of and claims priority to the co-pending patent application with Ser. No. 16/054,627, now U.S. Pat. No. 10,700,998, filed Aug. 3, 2018, by W. Wang, entitled "VOQ-Based Network Switch Architecture Using Multi-Stage Arbitration Fabric Scheduler," and hereby incorporated by reference in its entirety.

TECHNICAL FIELD

Embodiments of the present invention are related to the field of communication networks, and in particular, to packet scheduling mechanisms in network switches.

BACKGROUND

A network switch is a networking device that interconnects and manages communications among multiple devices in a computer network by using packet switching. A network switch typically includes control logic and operates to process received network packets through multiple processing stages and route the packets to other network devices. Ethernet network switches are a most common form of network switches.

In a network switch having a virtual output queue (VOQ)-based architecture, packets received at the ingress ports are enqueued into VOQs based on the destination egress ports and then directed to the egress ports through a switching fabric, e.g., a cross-bar switch. VOQ-based packet switching offers significantly higher network processing bandwidths than output queue-based switching which requires much large memory speeds for packet buffering.

Interface channelization is an effective mechanism to enhance network switch throughputs. In a channelized interface of a network switch, multiple ingress/egress ports of the switch can be logically grouped into one port (or port group) through configuration. Interface channelization provides expanded bandwidth but adds complexity to the network switch designs.

Further, for packet handling, according to a conventional store-and-forwarding approach, the ingress logic needs to fully receive and save each incoming packets in a buffer before forwarding the packet to the egress port. This requires a packet be stored and forwarded a second time at the egress side and thus causes very long packet-in-and-out latency in the system. In comparison, a cut-through approach offers much lower system latency as a packet can be forwarded from the ingress port to an egress port before it is fully received at the input port. However, cut-through switching requires, once started forwarding, a packet should be continuously scheduled and forwarded to the egress port in a constant speed. Otherwise, packet errors will occur.

SUMMARY

Accordingly, embodiments of the present disclosure provide a virtual output queue (VOQ)-based network switch architecture capable of supporting interface channelization and cut-through switching and yet with enhanced system performance efficiency.

A network switch according to embodiments of the present disclosure includes a plurality of ingress tiles (or "tiles" herein), a switch fabric, a fabric scheduler, and a plurality of egress ports grouped into port groups (PTGs). Each PTG is a group of channelized ports that may be configured to be two 400GE ports or up-to eight ports of 100GE, as two examples. Each ingress tile maintains VOQs corresponding to all the egress ports, which are grouped into virtual port groups (VOGs) corresponding to the PTGs. Each ingress tile has a VOQ scheduler operable to generate schedule requests for sending specific data from the tile to a destination egress port through the switch fabric. The VOQ scheduler can accumulate enough data before sending a request to the fabric scheduler to avoid underrun during cut-through switching. Further, multiple packets can be packed as a data quantum and scheduled through a single request.

The fabric scheduler maintains information of each active request submitted from the VOQ scheduler, including data length, source tile ID, destination egress port ID, fabric traffic class (TC) of the data, etc. Each request is associated with a request state indicating whether the data in the request is a start of a quantum (SoR state) or in the middle of the quantum (MoR state). The fabric scheduler maintains request states and boundaries of packets and quanta, and causes one packet per destination egress port (or "destination port" herein) to progress through the switch fabric. For each tile and each cycle, the fabric scheduler schedules up to a particular number of data cells corresponding to data path bandwidth of the ingress tile. The scheduled data cells from a same ingress tile can be output from the ingress ports of one PTG in a time-division multiplexing (TDM) manner.

Provided with the requests from the plurality of ingress tiles, the fabric scheduler performs a multi-stage scheduling process that progressively narrow the selection of requests by sequentially arbitrating the requests in the VOP level, the VOG level, the ingress tile level, the egress port level, and the egress PTG level. More specifically, in the first stage, for each cycle and with respect to a VOP of each ingress tile, the fabric scheduler arbitrates the multiple requests associated with the VOP based on request state. An MoR request takes precedence over any SoR request associated with the VOP. This stage results in up to one selected request for each VOP, for example. In the second stage, with respect to a VOG of each ingress tile, the fabric scheduler arbitrates the multiple requests associated with different VOPs in the VOG that are selected in the first stage. The second stage arbitration can be based on VOP rotating priority within the VOG and request state, and result in up to one selected request for each VOG, for example. In the third stage, with respect to an ingress tile, the fabric scheduler arbitrates the multiple requests associated with different VOGs within the tile that is selected in the second stage. The arbitration can be based on VOP rotating priority, request state, and VOG rotating priority. A maximum limit may be imposed on the number of requests selected for each ingress tile for each cycle to match the data path bandwidth of the ingress tile.

In the fourth stage, the fabric scheduler performs a port level grant arbitration. With respect to an egress port, the fabric scheduler selectively grants the requests selected in the third stage and directed to the egress port in the port level by arbitrating the requests from different ingress tiles. The fourth stage arbitration can be based on TC arbitration weight, tile arbitration weight, request state, and port rotating priority. In the fifth stage, the fabric scheduler performs a PTG level grant arbitration. With respect to a PTG, the fabric scheduler selectively grants the requests selected in the fourth stage by arbitrating the multiple requests associated with different egress ports of the PTG. The fifth stage arbitration can be based on egress port rotating priority and request state.

As a result, a selection of granted requests is determined and sent to each of the ingress tiles. Each ingress tile then selectively accepts the grants directed to it based on request state, VOP rotating priority and VOG rotating priority. The data associated with the accepted requests is then retrieved from the ingress tile and sent to the switch fabric for transmission to the destination egress ports.

According to embodiments of the present disclosure, a VOQ in each ingress tile is configured to generate schedule requests and maintain comprehensive information of received packets, whereas the fabric scheduler needs only maintain information of the active requests that is adequate for the multi-stage arbitration, e.g., by using a shallow FIFO. This function partition advantageously allows a simplified and small-size circuitry design for the fabric scheduler. Further, as data is scheduled in the unit of quantum and based on packet boundary, multiple short packets can cross the switch fabric in continuous cycles. Thus, the average schedule turnaround time and the overall system latency can be advantageously reduced.

Furthermore, by using the request states, the fabric scheduler ensures that a data quantum indicated in one request can cross the switch fabric in a constant speed (e.g., minimum speed) without interruption. This can advantageously prevent packet errors caused by underrun at the egress side. Still further, with the egress ports being grouped into PTGs, and the VOPs being grouped into VTGs, the scheduling process can advantageously support interface channelization in the network switch.

This summary contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
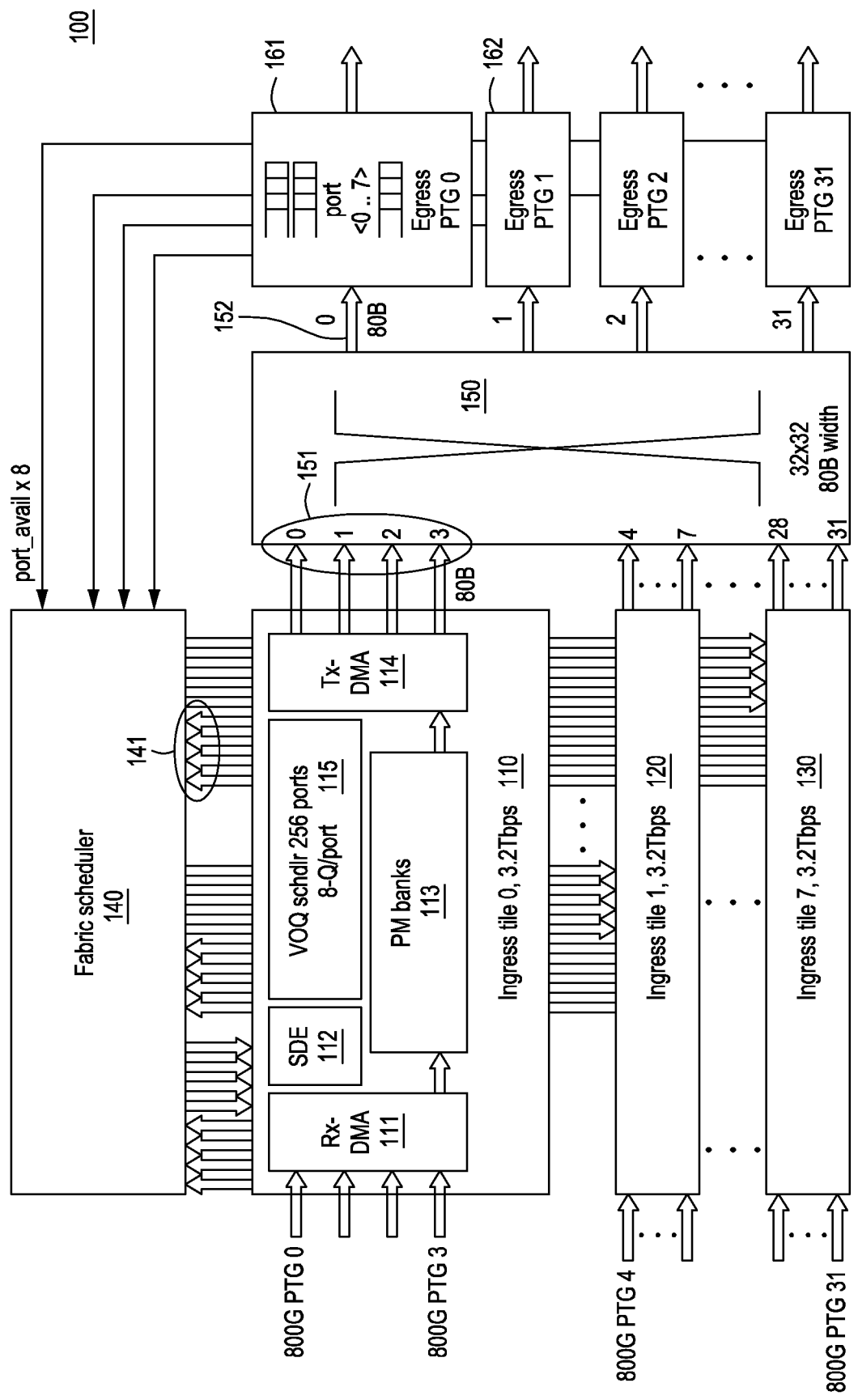
FIG. 1 illustrates the configuration of an exemplary network switch in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing figures. Similarly, although the views in the drawings for the ease of description generally show similar orientations, this depiction in the figures is arbitrary for the most part. Generally, the invention can be operated in any orientation.

It will be appreciated that the particular numbers used in the description of the embodiments with reference to the components, bandwidth, line rate, storage capacity and data rates, and etc., are merely exemplary and the present disclosure is not limited thereto.

FIG. 1 illustrates the configuration of an exemplary network switch 100 in accordance with an embodiment of the present disclosure. The network switch 100 may be an Ethernet switch and includes eight ingress tiles (e.g., tiles 110, 120, and 130), a fabric scheduler 140, a switch fabric 150, and 256 egress ports. In this example, each tile has four input ports which can be dynamically allocated to one or more channels. The 256 egress ports are grouped into 32 port groups (PTGs), PTG 0-PTG 31, each PTG composed of ports.

Each ingress tile has a data path coupled to the switch fabric 140, a processing engine 112 for processing the packets, e.g., a software-defined engine (SDE), and a virtual output queue (VOQ) scheduler 115 configured to generate schedule requests for packets received at the instant tile and submit the requests to the fabric scheduler 140. A packet received at the ingress tile 110 is processed and directed to a destination egress port via the switch fabric 150 in a scheduled time as controlled by the VOQ scheduler 115 and the fabric scheduler 140.

The data path in each tile includes input ports, a receive (Rx)-direct memory access (Rx-DMA) 111, packet memory banks 113, and a transmit (Tx)-DMA (Tx-DMA) 114. In each tile, received packets are stored in the PM banks 113 and enqueued into VOQs corresponding to all the 256 egress ports. Each input port may provide a physical interface to other networks or devices and have a maximum line rate of 800 Gigabit bit per second (800 Gbps or "800G" herein). Thus, the four inputs ports can provide an aggregated rate of 3.2 Terabit per second (3.2 Tbps or "3.2T" herein). The input ports can be configured into different operational modes. For example, each input port may be configured as a 100G port individually, or four input ports can be grouped and configured as 4×200G and in a time division multiplexing (TDM) manner.

Each tile maintains a virtual output port (VOP) of its own corresponding to a respective port of the 256 egress ports. For example, eight VOQs are associated with each virtual output port. The VOQs are also grouped into 32 virtual output groups (VOGs) corresponding to the 32 PTGs. However, the techniques disclosed herein are not limited to any particular configuration of line rate, number of ports, and number of tiles or group size.

The fabric scheduler 140 is coupled to each ingress tiles through a 4×80 Bytes (80B) interface, e.g., 141, that may be dynamically allocated. As described in greater detail below, the fabric scheduler receives requests, as well as various states related to packet scheduling, from the 8 ingress tiles and performs a multi-stage scheduling process to progressively narrow the selection of requests, including stages of arbitration in VOP level, VOG level, tile level, egress port level and PTG level. Packets specified in the requests that are granted and accepted requests are retrieved from the PM banks 113 and sent to selected interfaces 151 of the switch fabric 150 for transmission to the corresponding destination egress ports. Each destination 800G PTG is allocated with an 80B interface shared among multiple ports.

More specifically, during operation, in each cycle, up to four packets arrive from the 32×100GE ports coupled to each ingress tile, e.g., ingress tile 0 110. In the ingress tile 0 110, the Rx-DMA 111 writes the packets into the PM banks 113, where a page linked list is maintained for each packet. All the packets are enqueued into transmission queues (TxQs) and the TxQs maintain a packet linked list for each VOQ.

Each port queue is mapped to a fabric traffic class (TC) which may be defined according to quality of service (QoS) policies and requirements. The VOQ scheduler 115 maintains a FIFO pointing to each TC request to cover loop latency. The VOQ scheduler 115 generates schedule requests and submits the requests to the fabric scheduler. The TxQs can pack multiple packets into a quantum that can be encompassed in a single request and scheduled as a unit.

The VOQ scheduler 115 can accumulate at least a certain amount of data as a quantum for a request before sending the request. Thus, multiple short packets can be packed into one quantum and cross the switch fabric in continuous cycles. Thus, the average schedule turnaround time and the overall system latency can be advantageously reduced.

The fabric scheduler 140 maintains a data structure on the packet queues associated with each active request. The data structure includes a set of information pertinent to scheduling requests, including data length, quantum boundary, source tile ID, destination port ID, and traffic class. As the VOQ schedulers can supply the information to the fabric scheduler 150 in the form of requests and updates, the data structure in the fabric scheduler 140 can be maintained in queues of shallow depths. Hence, the function partition between the VOQ schedulers and the fabric scheduler advantageously allows a simplified and small-size circuitry design for the fabric scheduler.

For each schedule cycle, the fabric scheduler 150 schedules up to four cells (80 B per cell) for each ingress tile. The fabric scheduler also maintains states indicating packet boundaries and ensures that one packet per destination port is in flight in the switch fabric 150. This eliminates the need for packet res-assembling or waiting for the end of a packet (wait-for-EoP) at the egress side.

For a data quantum, the fabric scheduler 140 can schedule continuous cycles for it to cross the switch fabric 150 regardless of the number of packets in the quantum. For instance, if a quantum includes four packets with the total length equal to 4×80B+81B, it costs six cycles, and thus six requests, for the four packets to cross the fabric. The scheduler 140 can interleave packets for different destination ports with minimum bandwidth guarantee per destination port.

The ingress tiles accepts up to four cell schedules per cycle and binds them to the four fabric interfaces 151 of the switch fabric 150. The Tx-DMA operates to maintain fixed cycle latency from receipt of schedule to data being present at the fabric interface. Once a packet starts on an interface, it stays on the same interface until the entire packet crosses the switch fabric 150.

The switch fabric 150 may be a non-blocking fabric and delivers data from an ingress tile to a destination egress PTG. All the ports (e.g., 161 and 162) in the PTG share one output interface 152 of the switch fabric 150. Due to the system latency, its typically takes several cycles from submitting a request to transmitting the request data at an egress port. In some embodiments, each PTG only grants up to one request in any given cycle, and data from different ingress tiles can be transmitted out from the different ports of the PTG in a TDM manner. Using TDM within a PTG can effectively reduce the system latency and offers flexibility of channelized interface configuration. When all the ports are busy, each port gets a minimum guarantee according to the TDM schedule. When some ports are idle, the time slots are shared to speed up data crossing the switch fabric 150, which can significantly increase schedule efficiency.

Figure 2:
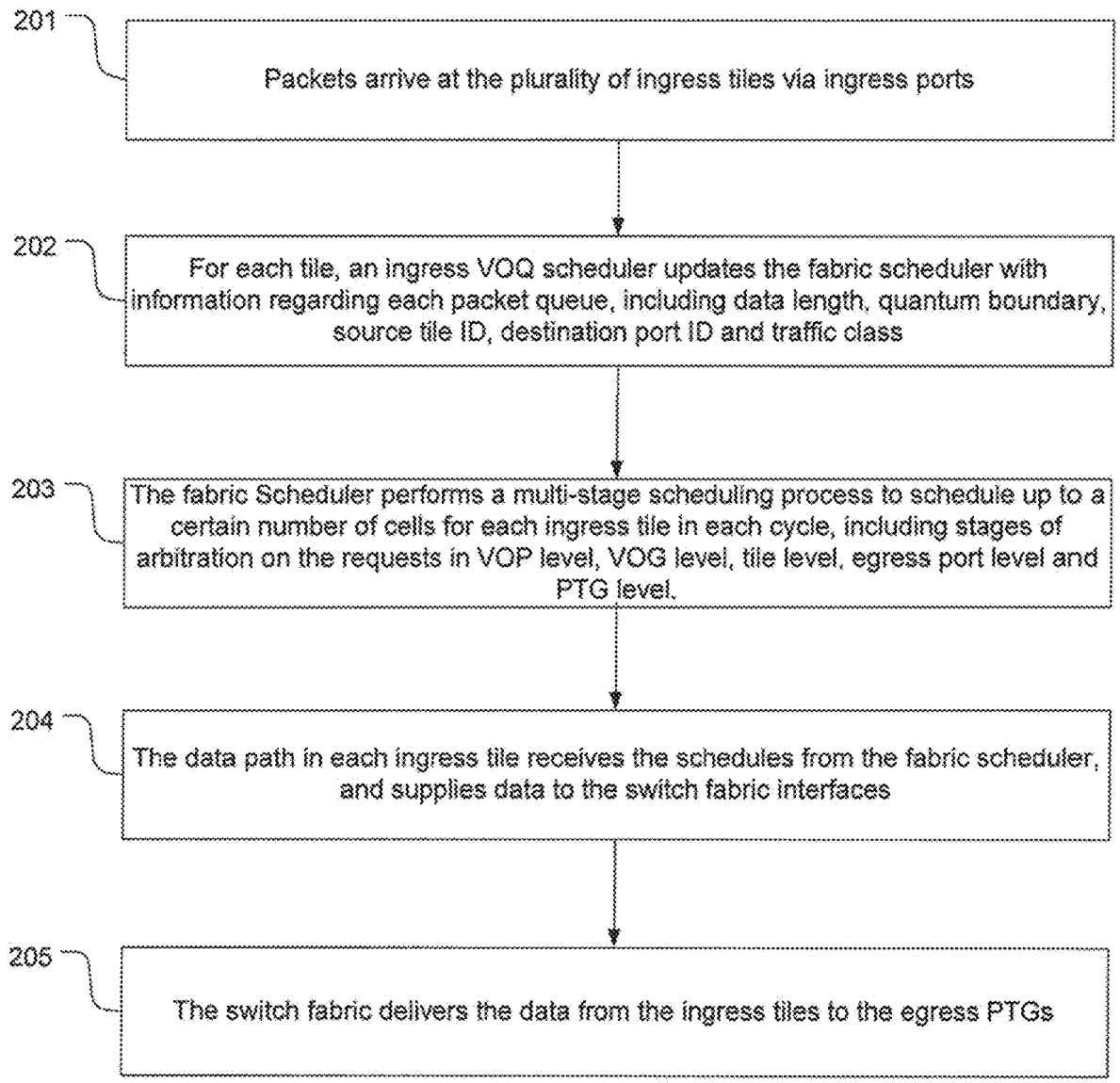
FIG. 2 is a flowchart depicting an exemplary process of scheduling received packets for transmission at the egress ports of a network switch in accordance with an embodiment of the present disclosure.

FIG. 2 is a flowchart depicting an exemplary process 200 of scheduling received packets for transmission at the egress ports of a network switch in accordance with an embodiment of the present disclosure. Process 200 can be performed by the network switch shown in FIG. 1 for example. At 201, packets are received at the ingress ports of a plurality of ingress tiles. Each ingress tile has a VOQ scheduler operable to generate requests for scheduling data received at the instant tile. At 202, the VOQ scheduler of each scheduler updates the fabric scheduler with information regarding each active request, such as data length, quantum boundary, source tile ID, destination port ID, and traffic class. However, this discussion is merely exemplary, any other suitable information may be supplied to, and maintained at, the fabric scheduler.

At 203, provided with the requests from multiple tiles, the fabric scheduler performs a multi-stage scheduling process to progressively narrow the selection of requests, including stages of arbitration in VOP level, VOG level, tile level, egress port level, and PTG level. In some embodiments, the amount of data scheduled for one tile per cycle matches the bandwidth of the data path in the tile. As described in greater detail below, each stage of arbitration is based on a respective set of states and other information and according to a respective process. In the example show in FIG. 1, for ingress tile 0, in the case that the Tx-DMA read bandwidth is four cells per cycle, the fabric scheduler correspondingly schedules no more than four cells per cycle for the tile.

At 204, the data path in each ingress tile, particularly the TxQ and the Tx-DMA, receives schedules for up to four cells from the fabric scheduler per cycle. The request data is retrieved from the packet memory and sent to the switch fabric interfaces. The data path is capable of maintaining constant cycle latency from receipt of the schedules to delivering the data to the switch fabric interfaces. Once a packet starts on an interface, it remains on the same interface until the entire packet crosses the switch fabric. At 206, the switch fabric transmits the data from the input interfaces to the output interfaces coupled to the PTGs. Data from different ingress tiles can be transmitted out from the different ports of the PTG in a TDM manner.

Figure 3:
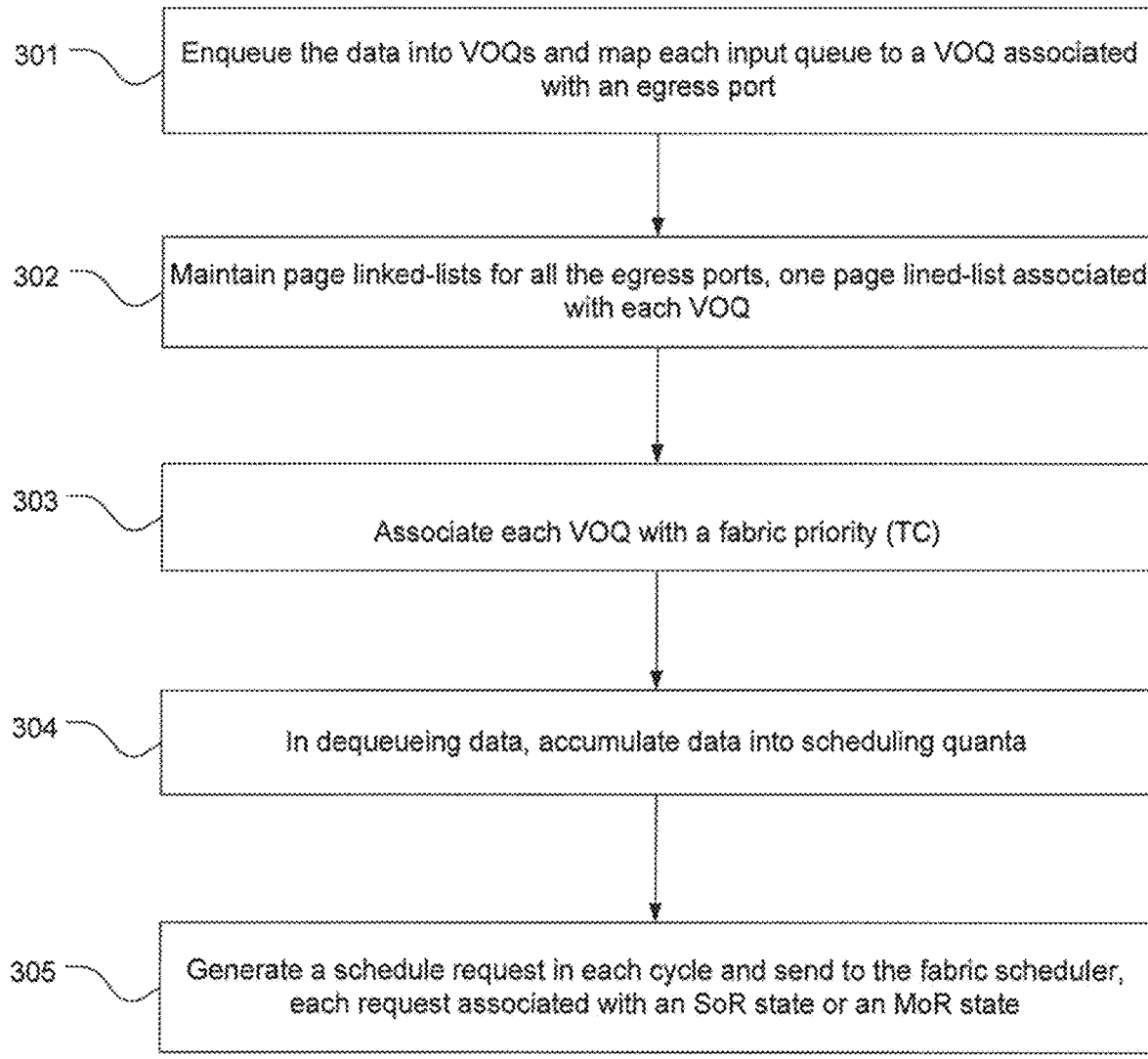
FIG. 3 is a flowchart depicting an exemplary process of generating schedule requests in an ingress tile for supply to a fabric scheduler of a network switch in accordance with an embodiment of the present disclosure.

FIG. 3 is a flowchart depicting an exemplary process 300 of generating schedule requests in an ingress tile for supply to a fabric scheduler of a network switch in accordance with an embodiment of the present disclosure. Process 300 may be performed by a VOQ scheduler 115 in an ingress tile as shown in FIG. 1 for example. At 301, each input queue is mapped to a VOQ associate with an egress port. At 302, page linked-lists are maintained in a FIFO for all the egress ports (e.g., 256 ports in the example shown in FIG. 1), one page linked-list associated with each VOQ. At 303, when dequeueing the data, each VOQ is assigned with a fabric priority according to the TC which may be defined based on QoS policies or requirements.

At 304, in dequeueing data, a scheduling quantum is accumulated for each schedule request. Short packets may be packed into one quantum to increase schedule efficiency. At 305, a schedule request is generated in each cycle and sent to the fabric scheduler, the request including information such as data length, packet/quantum boundary, source tile ID, destination port ID, and traffic class.

The data length in each scheduling quantum may be user-configurable. For instance, one scheduling quantum may take a number of consecutive cycles for the entire quantum to cross the switch fabric completely. In such a case, a request is generated for the same quantum and submitted to the fabric scheduler in each cycle. That is the VOQ scheduler repeatedly sends a request in multiple cycles to the fabric scheduler for the same quantum. Once transmission of the quantum starts, the same switch fabric input interface is used to transmit the entire quantum. To this end, each request is associated with a request state indicating whether the data in the request is a start of a quantum (SoR state) or in the middle of the quantum (MoR state).

As described in greater detail below, based on the updated request state and the packet boundary, the fabric scheduler schedule a certain number of cycles (e.g., consecutive cycles) of an individual quantum during the multi-stage arbitration process. As a result, each data packet can be scheduled to cross the switch fabric continuously and in a constant rate without causing destination egress port underrun. This advantageously eliminates the need for store-and-forwarding or packet or reassembling at the egress side before transmitting it out from an egress port. It also eliminates the need for waiting for the end of the packet to be received at egress side. Therefore, data can be transmitted through the fabric switch in a cut-through fashion, which is far more efficient than a conventional approach that requires store-and-forwarding at both the ingress side and the egress side. However, it will be appreciated that a network switch according to embodiments of the present disclosure is not limited to forwarding packets in a cut-through fashion.

Figure 4:
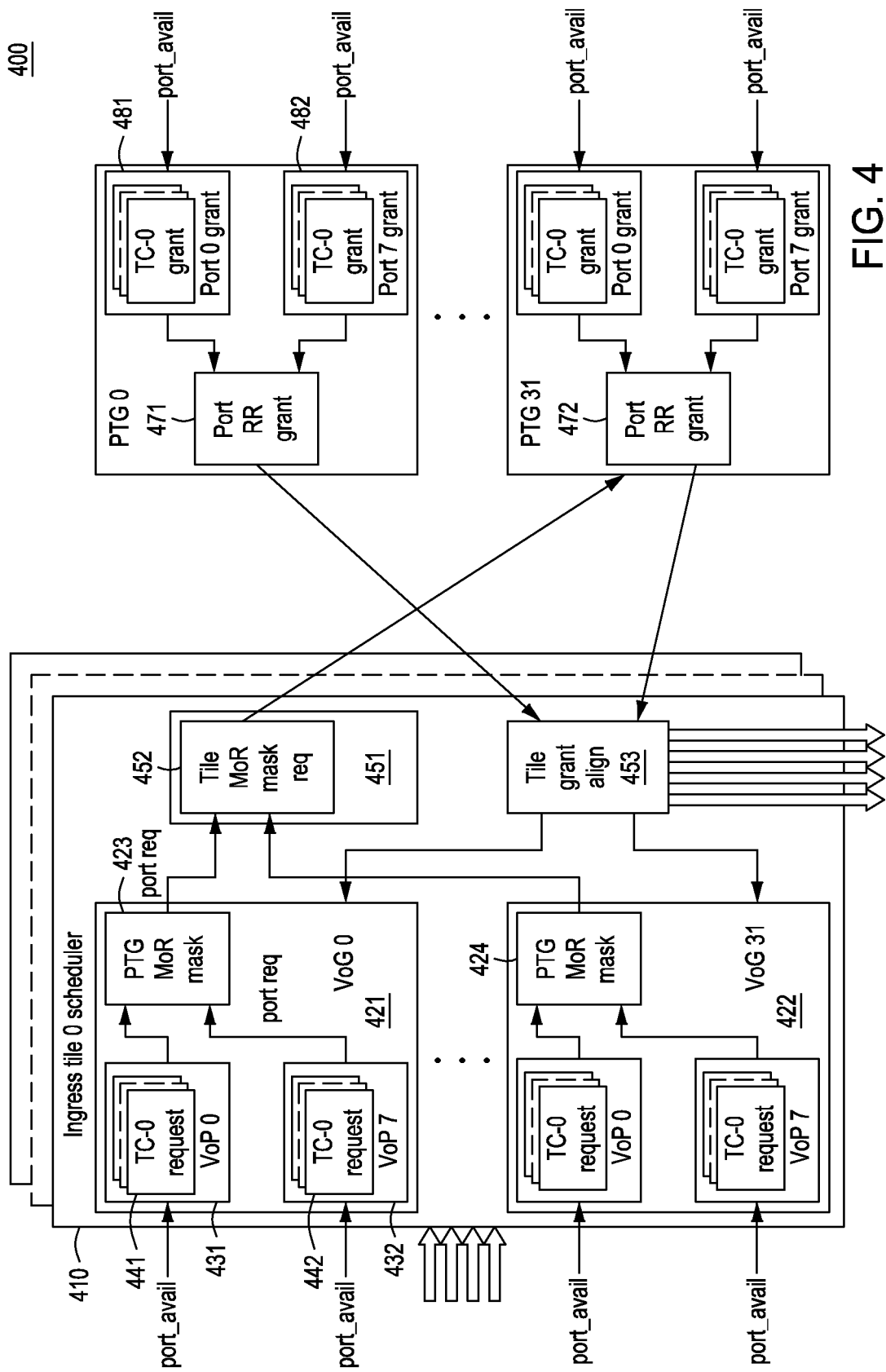
FIG. 4 illustrates the configuration of an exemplary fabric scheduler operable to schedule data for transmission from the ingress tiles to the egress ports of the network switch in FIG. 1 through a multi-stage arbitration process in accordance with an embodiment of the present disclosure.

FIG. 4 illustrates the configuration of an exemplary fabric scheduler 400 operable to schedule data for transmission from the ingress tiles to the egress ports of the network switch in FIG. 1 through a multi-stage arbitration process in accordance with an embodiment of the present disclosure. Corresponding to the eight tiles in the network switch, the fabric scheduler 400 has eight ingress tiles schedulers, e.g., ingress tile 0 scheduler 410. Corresponding to the 32 PTGs, the fabric scheduler 400 further has 32 egress grant schedulers which include port grant modules and PTG grant modules. Using the ingress tile scheduler 410 as an example, it includes 8×32 VOP schedule modules (e.g., 441 for VOP 0 of VOG 0, and 442 for VOP 7 of VOG 0), 32 VOG schedule modules (e.g., 421 for VOG 0 and 422 for VOG 31), a tile schedule module 451, and a tile grant alignment module 453.

A VOP schedule module (e.g., 441) is configured to select a set of requests by arbitrating among different VOQs associated with the same VOP in an ingress tile. The arbitration may be performed based on TC priority and request state. The VOP schedule modules each output a selection of requests to the associated VOG schedule module (e.g., 421 for VOG 0). Each VOG schedule module is configured to further narrow the selection by arbitrating among the different VOPs of the same VOG in the ingress tile. Particularly, a VOG schedule module (e.g., 421) includes a PTG MoR mask (e.g., 423) operable to ensure that each MoR request is selected continuously in this arbitration stage, as described in greater detail with reference to FIGS. 5 and 6. The VOG schedule modules output their selection of requests to the associated tile schedule module (e.g., 451) which is configured to further narrow the selection by arbitrating among the different VOGs of the same tile. Particularly, a tile schedule module (e.g., 451) uses a tile MoR mask (e.g., 452) to ensure that each MoR request is selected continuously in this arbitration stage, which is described in greater detail with reference to FIGS. 5 and 7.

Corresponding to the 256 egress ports and 32 PTGs, the fabric scheduler further includes 8×32 port grant modules (e.g., 481 for egress port 0 of PTG 0 and 482 for egress port 7 for PTG 0) and 32 PTG grant modules (471 and 472). Each PTG grant module receives all the requests associated with the PTG that have been selected by the 32 tile schedule modules. Similarly, each port grant module (e.g., 481) receives all the requests associated with the egress port that have been selected by the 32 tile schedule modules. A port grant module selectively grants the requests by further narrowing the selection based on a number of factors, as described in greater detail with reference to FIGS. 5 and 8. A PTG schedule module then selects the requests associated with the PTG that have been granted in the egress port level, resulting in a selection of granted requests in the PTG level, as described in greater detail with reference to FIGS. 5 and 9.

As a result, each PTG grant module sends its selection of granted requests to all the tiles. For each tile, the corresponding tile grant alignment module performs grant alignment and thereby selectively accepts the grants, as described in greater detail with reference to FIGS. 5 and 10. The accepted grants are sent to the Tx-DMA of the ingress tile and the request data is retrieved from the PM banks accordingly. The fabric scheduler may be configured to schedule no more than a certain number of requests per ingress tile per cycle due to the read bandwidth limit in the data path. For instance, if the read bandwidth of the Tx-DMA from the PM banks is four reads per cycle, the fabric scheduler correspondingly schedules up to four requests per ingress tile per cycle.

The present disclosure is not limited to any specific configuration or structure used to implement each of the various components in the network switch as shown in FIG. 1 or each of the various components in the fabric scheduler as shown in FIG. 4. They can be implemented in circuits, software, firmware, or a combination thereof.

Figure 5:
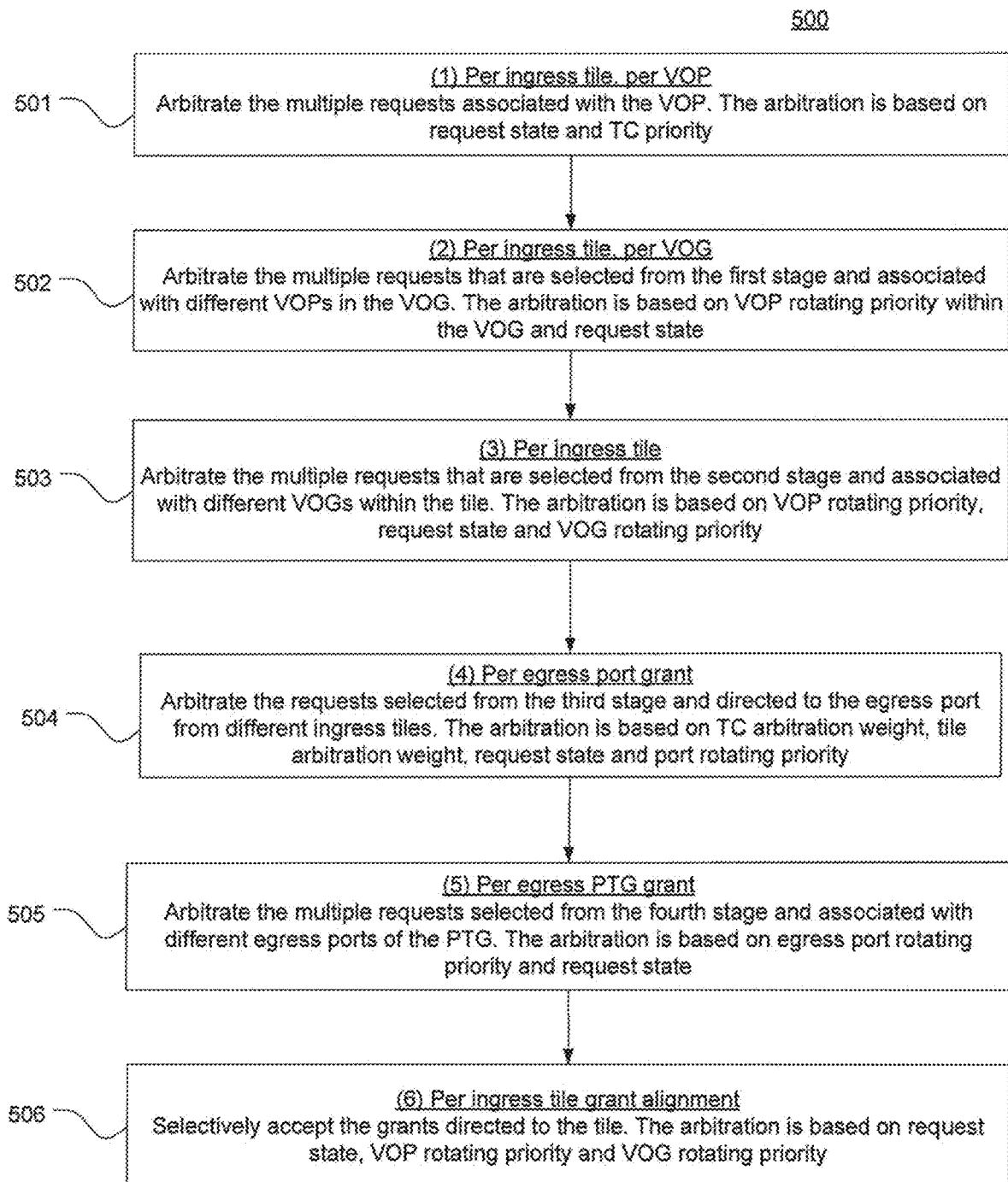
FIG. 5 is a flowchart depicting an exemplary process of scheduling data for transmission from the ingress tiles to the egress ports through multi-stage arbitration in accordance with an embodiment of the present disclosure.

FIG. 5 is a flowchart depicting an exemplary process 500 of scheduling data for transmission from the ingress tiles to the egress ports through multi-stage arbitration in accordance with an embodiment of the present disclosure. Process 500 may be performed by the fabric scheduler as shown in FIG. 4 for example. Provided with the requests submitted from the plurality of ingress tiles, the fabric scheduler performs a scheduling process that progressively narrows the selection of requests by sequentially arbitrating the requests in the VOP level, the VOG level, the ingress tile level, the egress port level, and the PTG level.

More specifically, at 501, in the first stage ("per ingress tile, per VOP"), for each cycle and with respect to a VOP of each ingress tile, the fabric scheduler arbitrates the multiple requests associated with the VOP based on request state and TC priority, as described in greater detail with reference to FIG. 6. Generally, an MoR request takes precedence over any SoR request associated with the VOP. In this first stage, up to one request is selected for each VOP for example. This stage may be performed by a VOP schedule module (e.g., 441) as shown in FIG. 4.

For instance, each VOP is associated with four TCs (TC-0 to TC-3) and one of them is assigned with an active status. The VOQ scheduler supplies up four requests for each VOP per cycle, one associated with each TC. If any of the four requests is an MoR request which contains data of a quantum that has been partially scheduled, the associated TC is designated as the active TC for the cycle and the MoR is selected for this VOP. However, if there is no MoR request and when (1) any TC has a VOQ that is not empty, (2) there is no packet currently in transmission, and (3) the destination egress port is available, the VOP schedule module requests a TC-bitmap for all the non-empty TCs and accordingly selects an SoR request.

At 502, in the second stage (per ingress tile, per VOG), with respect to a VOG of each ingress tile, the fabric scheduler arbitrates the multiple requests resulting from the first stage and associated with different VOPs in the VOG. The arbitration in the second stage is based on VOP rotating priority within the VOG and request state. Up to one request is selected for each VOG in the second stage, for example.

At 503, in the third stage ("per ingress tile"), with respect to an ingress tile, the fabric scheduler arbitrates the multiple requests resulting from the second stage and associated with different VOGs within the tile. The arbitration is based on VOP rotating priority, request state, and VOG rotating priority. A maximum limit may be imposed on the number of requests selected for each ingress tile for each cycle, e.g., to match the reading bandwidth of the ingress tile. In the example shown in FIG. 1, for each tile per cycle, up to four requests are selected from the up to 32 requests that are associated with the 32 VOGs.

At 504, in the fourth stage ("per egress port grant"), with respect to an egress port, the fabric scheduler arbitrates the requests resulting from the third stage and directed to the egress port from different ingress tiles. The arbitration is based on TC arbitration weight, tile arbitration weight, request state, and port rotating priority. In the example shown in FIG. 1, each egress port receives up to eight requests from the eight tiles, up to one from each tile, and grants only one request for each cycle.

At 505, in the fifth stage ("per egress PTG grant"), with respect to a PTG, the fabric scheduler arbitrates the multiple requests resulting from the fourth stage and associated with different egress ports of the PTG. In each cycle, each PTG grants one request from a tile. Thus, the 32 PTGs issue up to 32 grants per cycle. The arbitration is based on egress port rotating priority and state of request. As a result, a selection of granted requests is determined and broadcast to all the tile grant alignment modules of all the tiles.

At 506, in the sixth stage, with respect to each ingress tile, the grants are selectively accepted based on request state, VOP rotating priority, and VOG rotating priority. The data identified in the accepted requests is then retrieved from the ingress tile and sent to a fabric interface of the switch fabric for transmission to the destination egress ports.

Figure 6:
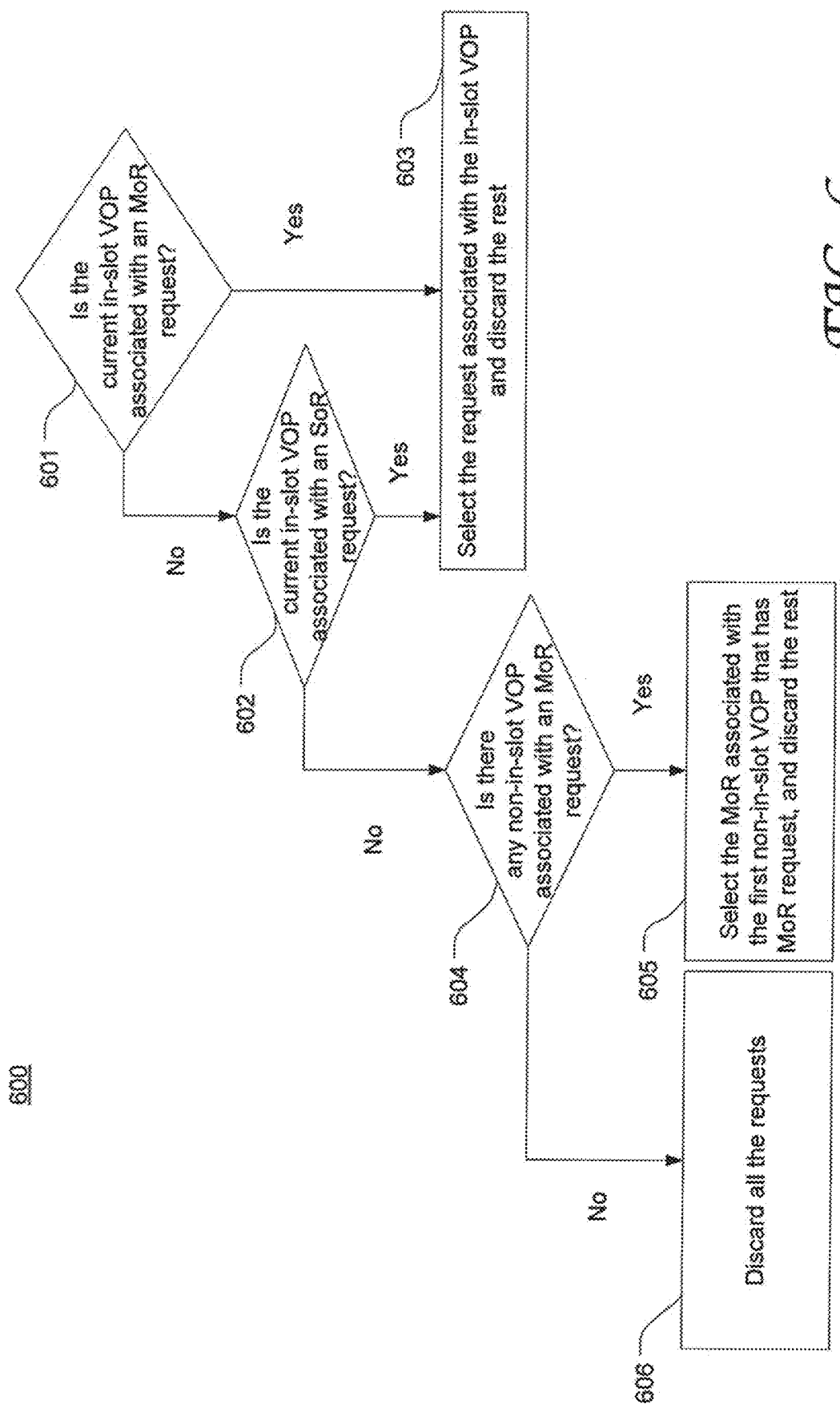
FIG. 6 is a flowchart depicting an exemplary process of arbitrating the multiple requests in the VOG level in accordance with an embodiment of the present disclosure.

FIG. 6 is a flowchart depicting an exemplary process 600 of arbitrating the multiple requests in the VOG level in accordance with an embodiment of the present disclosure. For example, process 600 corresponds to the second stage 502 in FIG. 5 and may be performed by a VOG schedule module (e.g., 421 that includes a PTG MoR mask 452) as shown in FIG. 4.

With respect to each VOG, the fabric scheduler maintains a per-cycle rotating priority calendar for the VOPs within the VOG. The priority calendar may be specific to each interface channelization mode. Herein, the current highest priority port (VOP or egress port) is referred to as an "in-slot" port. For example, for the 8×100GE mode, the priority calendar is populated with all eight ports 0-7; for the 1×800GE mode, the calendar is populated with a single port (e.g., port 0); and for the 4×200GE mode, the calendar is populated with four ports, e.g., port 0-port 3.

At 601, it is determined if the in-slot VOP is associated with an MoR request. If yes, this MoR request is selected, and the rest of requests associated with the VOG are discarded (at 603). If no, it is further determined whether the in-slot VOP is associated with an SoR request (at 602), this SoR request is selected and the rest of the requests associated with the VOG is discarded (at 603).

If no request is associated with the in-slot VOP (as determined at 601 and 602), it is further determined whether any non-in-slot VOP is associated with an MoR request (at 604). If yes, the MoR request of the first non-in-slot (as determined by using the priority calendar) is selected and the rest are discarded (at 606); if no, all the requests are discarded (at 606). The non-in-slot SoR requests are never selected and are masked off by the PTG MoR mask.

Figure 7:
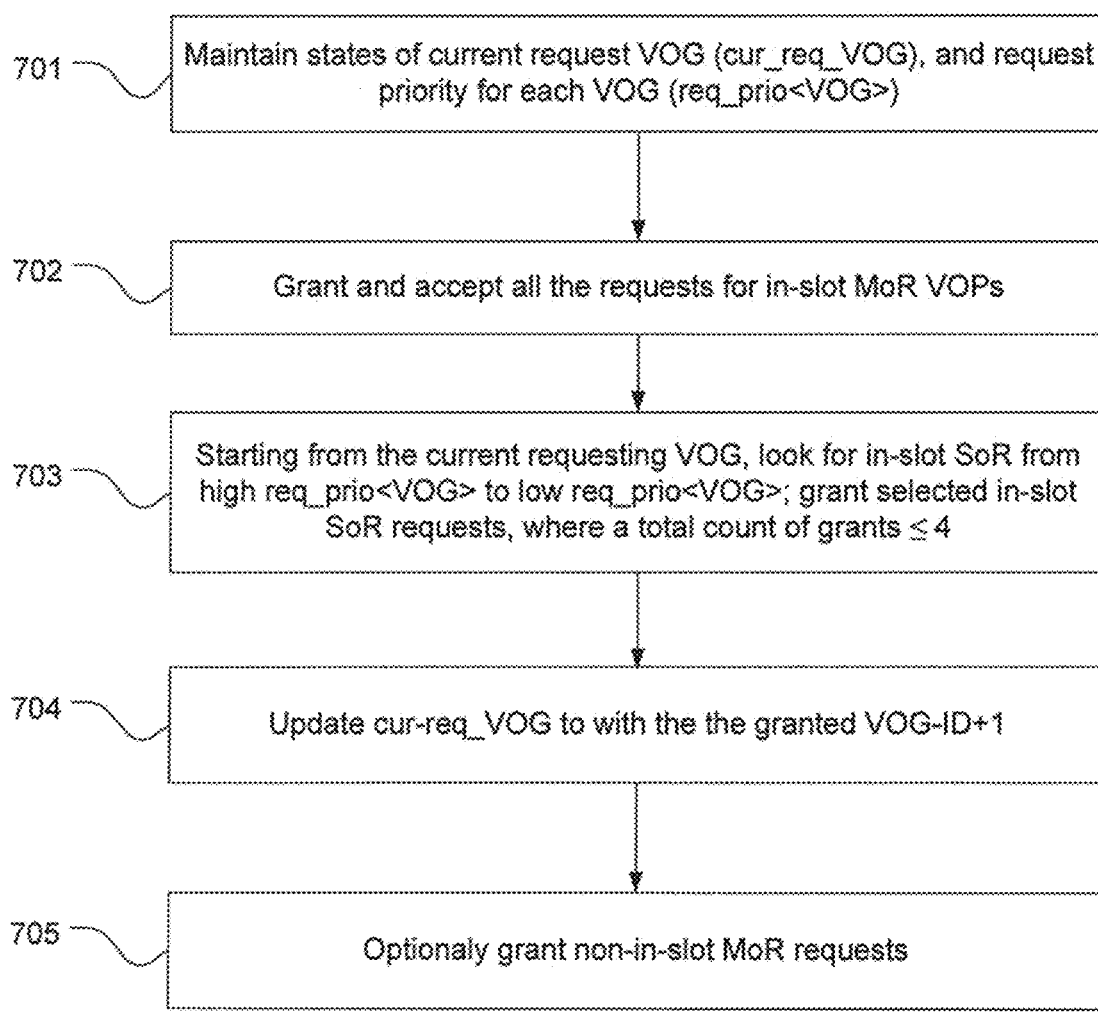
FIG. 7 is a flowchart depicting an exemplary process of arbitrating the multiple requests in the ingress tile level in accordance with an embodiment of the present disclosure.

FIG. 7 is a flowchart depicting an exemplary process 700 of arbitrating the multiple requests in the ingress tile level in accordance with an embodiment of the present disclosure. For example, process 500 corresponds to the third stage 503 in FIG. 5 and may be performed by a tile schedule module (e.g., 451 that includes a tile MoR mask 452) as shown in FIG. 4.

At 701, a set of states are maintained, which indicate the VOG of the current selected request ("cur req VOG") and the priority for each VOG ("req_prio<VOG>"). These states can be used to prevent a VOG with lower priority traffic from being starved. At 702, all the MoR requests associated with in-slot VOPs (or in-slot MoR requests) are given top priority and are always granted and accepted. The granted requests are counted so that they do not exceed the count limit four.

At 703, starting from the current request VOG, look for VOGs with an SoR request associated with in-slot VOPs (or in-slot SoR requests) from high to low request priority based on state req_prio<VOG>. These requests, if granted, are always accepted. The total number of granted in-slot SoR requests and in-slot MoR requests should not exceed four. At 704, after a request of a VOG is granted, the state cur req VOG is updated with the granted VOG-ID plus 1. A 705, the non-slot-MoR requests are optionally granted. That is, these requests may not be granted; and even if granted, they may not be accepted. In either case, there is no state updating. As a result of process 700, up to four requests are selected for each tile each cycle.

Figure 8:
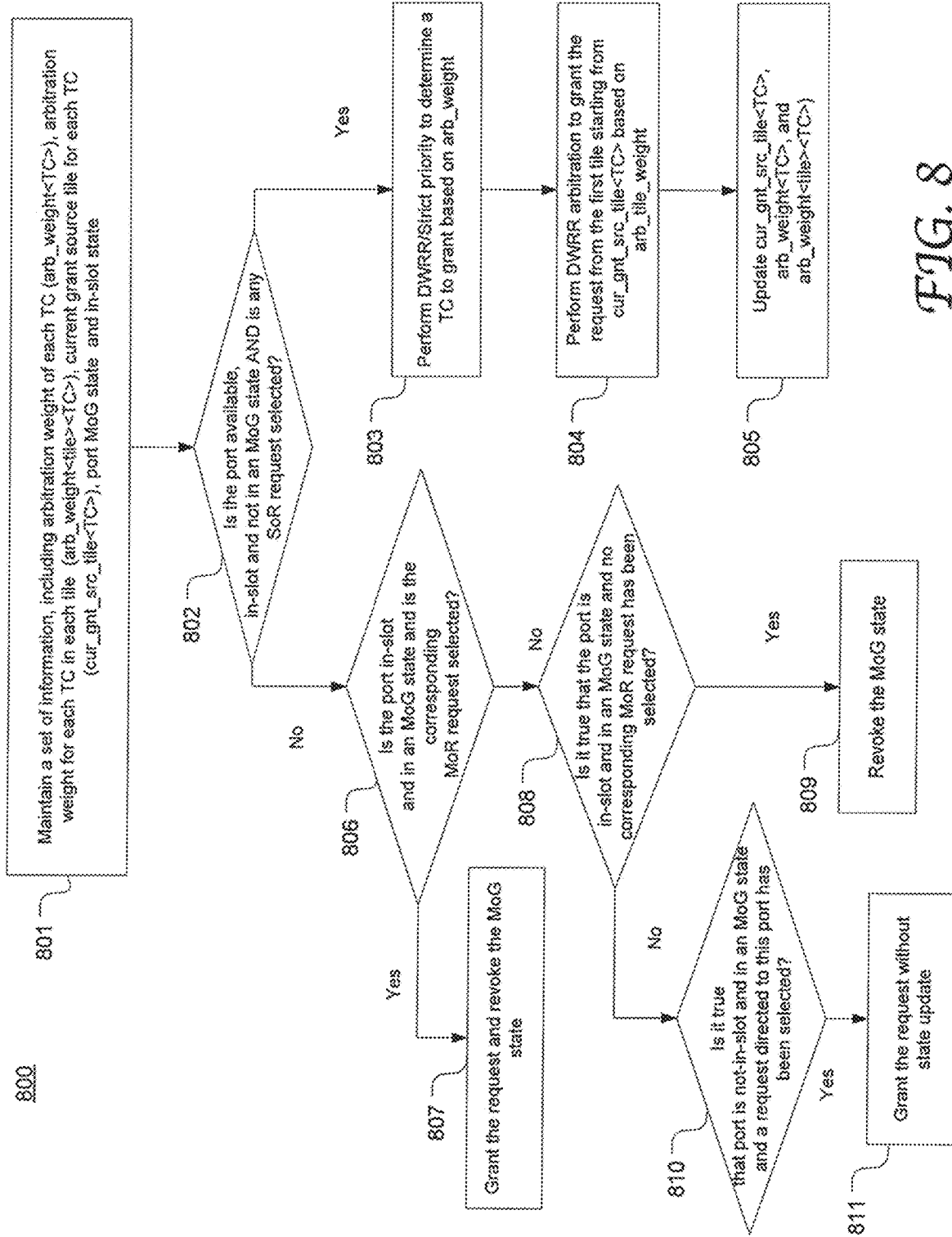
FIG. 8 is a flowchart depicting an exemplary process of granting a request in the egress port level by arbitrating the multiple requests directed to each egress port resulting from the third stage in accordance with an embodiment of the present disclosure.

FIG. 8 is a flowchart depicting an exemplary process 800 of granting a request in the egress port level by arbitrating the multiple requests directed to each egress port resulting from the third stage in accordance with an embodiment of the present disclosure. For example, process 500 corresponds to the fourth stage 504 in FIG. 5 and may be performed by a port grant module (e.g., 481) as shown in FIG. 4. At 801, the port grant module maintains a set of information, such as arbitration weight of each TC ("arb_weight<TC>"), arbitration weight of each TC in each tile ("arb_weight<tile><TC>"), current grant source tile for each TC ("cur_gnt_src_tile<TC>"), MoG state, and in-slot state of the egress port. An MoG state indicates that the egress port is in the middle of transmitting a quantum. An in-slot state indicates that the egress port has the highest rotating priority in the PTG for the instant cycle.

If the egress port is available and in-slot and not in the MoG state, and an SoR request directed to the port is selected (as determined at 802), deficit-weighted round robin (DWRR) or strict priority arbitration is performed (at 803) to determine a TC to grant based on arb_weight<TC>. The value of arb_weight<TC> may be defined based on QoS policies or requirements, for example. At 804, DWRR arbitration is performed to grant the request from the first tile starting from cur_gnt_src_tile<TC> based on arb_tile_weight. At 805, the port states of cur_gnt_src_tile<TC>, arb_weight<TC> and arb_weight<tile><TC> are updated.

On the other hand, if the determination step at 802 results in a "no", it is further determined (at 806) whether the port is in-slot and in an MoG state and whether the corresponding MoR request has been selected, and whether the request count is 1. If yes, this MoR request is granted and the MoG state of the port is revoked at 807.

However, if the determination step at 806 results in a "no," it is further determined (at 808) whether the port is in-slot and in an MoG state and no corresponding MoR request has been selected. If yes, the MoG state of the port is revoked at 808.

If the determination step at 808 results in a "no," ii is further determined (at 810) whether the port is not-in-slot and in an MoG state and a request directed to this port has been selected. If yes, the request is granted without state update at 811. The foregoing process 801-811 is repeated in each cycle for each egress port, and results in one granted request per cycle for the egress port.

Figure 9:
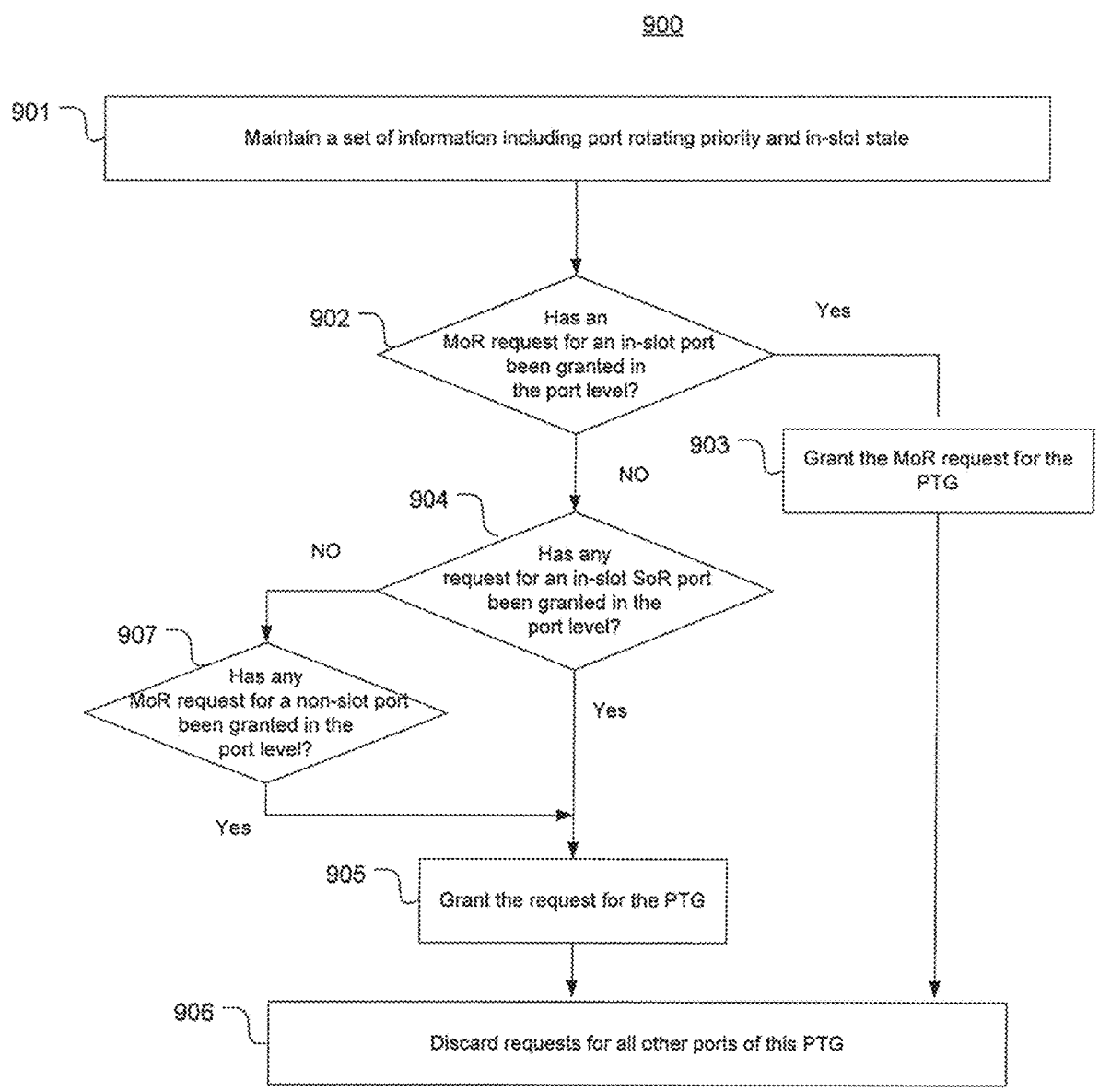
FIG. 9 is a flowchart depicting an exemplary process of granting a request in the PTG level by arbitrating the multiple requests directed to each PTG resulting from the fourth stage in accordance with an embodiment of the present disclosure.

FIG. 9 is a flowchart depicting an exemplary process 900 of granting a request in the PTG level by arbitrating the multiple requests directed to each PTG resulting from the fourth stage in accordance with an embodiment of the present disclosure. For example, process 500 corresponds to the fifth stage 505 in FIG. 5 and may be performed by a PTG grant module (e.g., 471) as shown in FIG. 4.

At 901, in each cycle, the PTG grant module maintains a set of information such as port rotating priority within the PTG and an in-slot state, e.g., same with the VOP rotating priority in a VOG in an ingress tile. At 902, it is determined whether an MoR request for an in-slot port has been granted by a port grant module. If yes, the MoR request is granted for this PTG (at 903) and other requests in the same PTG that have been granted in the port level are masked off and discarded (at 906).

If the determination step at 902 results in a "no," it is further determined (at 904) whether any SoR request for an in-slot port has been granted in the port level. If yes, this SoR request is granted for this PTG at 905. However, if no, it is further determined (at 907) whether any MoR request for a non-slot port has been granted in the port level. If yes, this request is granted for the PTG (at 905) and other requests for the same PTG that have been granted in the port level are masked off and discarded (at 906). The foregoing process 901-907 is repeated for each cycle and each PTG, and results in a total number of up to 32 PTG level grants per cycle, up to one for each PTG.

Figure 10:
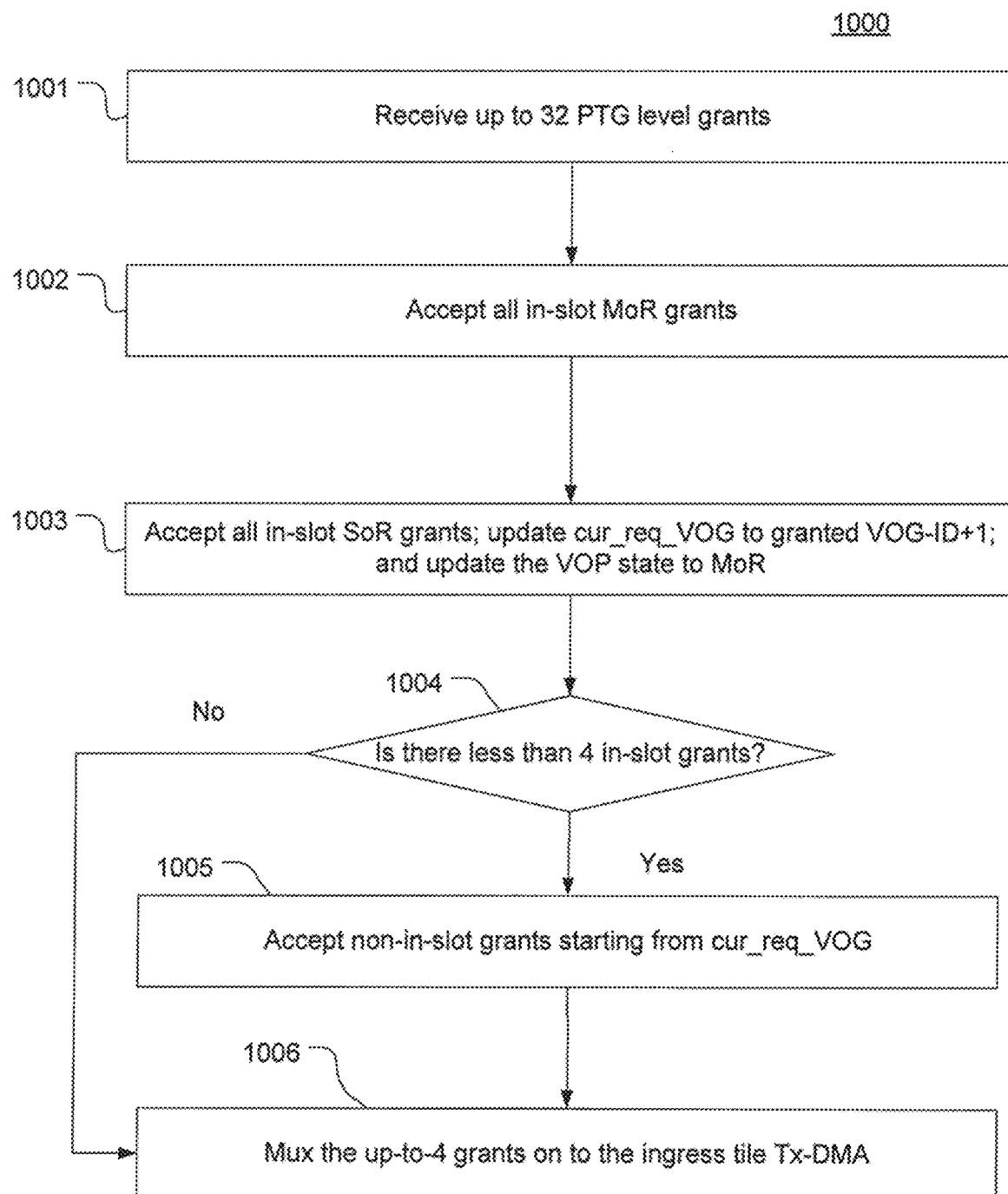
FIG. 10 is a flowchart depicting an exemplary process of grant alignment for each ingress tile in accordance with an embodiment of the present disclosure.

FIG. 10 is a flowchart depicting an exemplary process 1000 of grant alignment for each ingress tile in accordance with an embodiment of the present disclosure. For example, process 100 corresponds to the sixth stage 506 in FIG. 5 and may be performed by a tile grant alignment module (e.g., 453) associated with a respective tile as shown in FIG. 4. At 1001, the tile grant alignment module receives up to 32 grants from the 32 PTG grant modules corresponding to the 32 PTGs, among which up to four are directed to the instant tile. At 1002, all the grants to in-slot MoR requests are accepted. At 1003, all the in-slot SOR grants are accepted. The state of cur_req_VOG is updated with the granted VOG ID plus one. An MoR state is asserted for the VOP. If there are less than four in-slot grants (as determined at 1004), non-in-slot grants are accepted staring from the VOG with the cur_req_VOG state at 1005. At 1006, the up to four grants are sent to the ingress tile Tx-DMA, e.g., by multiplexing.

It will be appreciated that the arbitration processes in various levels as described with reference to FIGS. 6-10 are merely exemplary. Any other suitable methods, algorithms, sequences, criteria or information may be used to implement each arbitration processes without departing from the scope of the present disclosure.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A network device, comprising:
    a plurality of ingress tiles;
    a switch fabric coupled to said plurality of ingress tiles;
    a plurality of egress ports coupled to said switch fabric; and a scheduler coupled to said plurality of ingress tiles, wherein said scheduler:
  accesses schedule requests for transmitting packets received by said plurality of ingress tiles from said plurality of ingress tiles to said plurality of egress ports;
  selects a set of said schedule requests by arbitrating said schedule requests based on an ingress tile of said plurality of ingress tiles, a virtual output port group of said network device, and a virtual output port of said network device; and
  sends said set of said schedule requests to said plurality of ingress tiles, wherein packets associated with said set of said schedule requests are sent to said switch fabric.

2. The network device of claim 1, wherein said plurality of egress ports are grouped into a plurality of port groups, and wherein said scheduler selects said set of said schedule requests by also arbitrating said set of said schedule requests based on an egress port of said plurality of egress ports and a port group of said plurality of port groups.

3. The network device of claim 1, wherein each ingress tile of said plurality of ingress tiles is associated with a plurality of virtual output ports corresponding to said plurality of egress ports, and wherein said scheduler selects said set of said schedule requests by arbitrating said schedule requests that are directed to a same virtual output port of said plurality of virtual output ports of said ingress tile.

4. The network device of claim 3, wherein said scheduler selects said set of said schedule requests also based on fabric traffic class status and a request state.

5. The network device of claim 1, wherein each ingress tile of said plurality of ingress tiles is associated with a plurality of virtual output port groups, and wherein said scheduler selects said set of said schedule requests by arbitrating said schedule requests that are directed to a same virtual output port group of said plurality of virtual output port groups of said ingress tile.

6. The network device of claim 5, wherein each ingress tile of said plurality of ingress tiles is associated with a plurality of virtual output ports corresponding to said plurality of egress ports, wherein said scheduler is configured to maintain a request state for a virtual output port of said ingress tile, and wherein said scheduler:
  updates a virtual output port rotating priority in a virtual output port group of said plurality of virtual output port groups of said ingress tile, for each schedule cycle;
  assigns an in-slot status to said virtual output port of said plurality of virtual output ports with a highest priority in said virtual output port group; and
  selects said set of said schedule requests also based on said in-slot status and said request state.

7. The network device of claim 1, wherein said scheduler selects said set of said schedule requests by also arbitrating said schedule requests that are directed to a same ingress tile of said plurality of ingress tiles.

8. The network device of claim 7, wherein each ingress tile of said plurality of ingress tiles is associated with a plurality of virtual output port groups, and wherein said scheduler selects said set of said schedule requests also based on in-slot status, a current-request-virtual output port group, and a virtual output port group request priority.

9. The network device of claim 7, wherein the scheduler is further configured to:
  maintain a middle-of-grant-quantum state of an egress port of said plurality of egress ports; and
  arbitrate said set of schedule requests for a same egress port among said plurality of ingress tiles based on a set of states selected from the group consisting of: middle-of-grant-quantum state, in-slot status, fabric traffic class arbitration weight, ingress tile arbitration weight, and current-grant-source-tile for each fabric traffic class.

10. The network device of claim 1, wherein said scheduler selects said set of said schedule requests by also arbitrating said schedule requests that are directed to a same egress port of said plurality of egress ports.

11. The network device of claim 1, wherein said plurality of egress ports is grouped into a plurality of port groups, and wherein said scheduler selects said set of said schedule requests by arbitrating multiple requests directed to a same port group of said plurality of port groups.

12. A method of scheduling packets for transmission, said method comprising:
  receiving said packets at a plurality of ingress tiles of a virtual output queue-based network device;
  accessing schedule requests for transmitting data from said plurality of ingress tiles to a plurality of egress ports of said network device;
  selecting a set of said schedule requests, wherein said selecting comprises arbitrating said schedule requests based on an ingress tile of said plurality of ingress tiles, a virtual output port group of said network device, and a virtual output port of said network device; and
  sending data in said set of said schedule requests to a switch fabric that is coupled between said plurality of ingress tiles and said plurality of egress ports.

13. The method of claim 12, wherein said plurality of egress ports are grouped into a plurality of port groups, wherein said selecting further comprises arbitrating said schedule requests based on an egress port of said plurality of egress ports and a port group of said plurality of port groups.

14. The method of claim 12, wherein each ingress tile of said plurality of ingress tiles is associated with a plurality of virtual output ports corresponding to said plurality of egress ports, wherein said selecting further comprises arbitrating said schedule requests that are directed to a same virtual output port of said plurality of virtual output ports of said ingress tile, and also based on fabric traffic class status and a request state.

15. The method of claim 12, wherein each ingress tile of said plurality of ingress tiles is associated with a plurality of virtual output port groups, wherein said selecting further comprises arbitrating said schedule requests that are directed to a same virtual output port group of said plurality of virtual output port groups of said ingress tile.

16. The method of claim 15, wherein each ingress tile of said plurality of ingress tiles is associated with a plurality of virtual output ports corresponding to said plurality of egress ports, wherein said scheduler is configured to maintain a request state for a virtual output port of said ingress tile, and wherein said selecting further comprises:
  updating a virtual output port rotating priority in a virtual output port group of said plurality of virtual output port groups of said ingress tile, for each schedule cycle;
  assigning an in-slot status to said virtual output port of said plurality of virtual output ports with a highest priority in said virtual output port group; and
  selecting said set of said schedule requests also based on said in-slot status and said request state.

17. The method of claim 12, wherein said selecting further comprises arbitrating said schedule requests that are directed to a same ingress tile of said plurality of ingress tiles.

18. The method of claim 17, wherein each ingress tile of said plurality of ingress tiles is associated with a plurality of virtual output port groups, and wherein said selecting is also based on in-slot status, a current-request-virtual output port group, and a virtual output port group request priority.

19. The method of claim 17, wherein said selecting further comprises:
- maintaining a middle-of-grant-quantum state of an egress port of said plurality of egress ports; and
- arbitrating said set of schedule requests for a same egress port among said plurality of ingress tiles based on a set of states selected from the group consisting of: middle-of-grant-quantum state, in-slot status, fabric traffic class arbitration weight, ingress tile arbitration weight, and current-grant-source-tile for each fabric traffic class.

20. The method of claim 12, wherein said selecting further comprises arbitrating said schedule requests that are directed to a same egress port of said plurality of egress ports.

21. The method of claim 12, wherein said plurality of egress ports is grouped into a plurality of port groups, and wherein said selecting further comprises arbitrating multiple requests directed to a same port group of said plurality of port groups.

\* \* \* \* \*